United States Patent [19]

Homayoun

[11] Patent Number: 5,970,121
[45] Date of Patent: Oct. 19, 1999

[54] METHOD AND APPARATUS FOR OBTAINING FEEDBACK REGARDING DATA NETWORK SERVICES

[75] Inventor: Fereidoun Homayoun, Plano, Tex.

[73] Assignee: Nortel Networks Corporation, Richardson, Tex.

[21] Appl. No.: 08/928,571

[22] Filed: Sep. 12, 1997

[51] Int. Cl.$^6$ .............................. H04M 1/24; H04M 11/00
[52] U.S. Cl. .......................... 379/28; 379/1; 379/100.05; 379/92.01; 358/405
[58] Field of Search ..................................... 358/504, 406, 358/405; 379/1, 5, 6, 27, 28, 29, 34, 111, 113, 114, 115, 130, 265, 266, 92.01, 100.05, 100.01

[56] References Cited

U.S. PATENT DOCUMENTS

| | | | |
|---|---|---|---|
| 4,656,651 | 4/1987 | Evans et al. ................................. | 379/1 |
| 5,377,017 | 12/1994 | Lam ........................................ | 358/405 |
| 5,799,072 | 8/1998 | Vulcan et al. ........................... | 379/115 |
| 5,802,502 | 9/1998 | Gell et al. ................................ | 379/114 |

*Primary Examiner*—Paul Loomis
*Attorney, Agent, or Firm*—Vernon E. Williams

[57] ABSTRACT

A method and apparatus for obtaining real-time call by call feedback from customers is to the perceived quality of network services may be accomplished after communication via network connection between a calling party and at least one called party is completed. Upon completion, the network retains for a predetermined period of time at least a portion of the network connection to one of the parties involved in the communication. During this predetermined period of time the party provides feedback as to his or her perception of the quality of various aspects of the call. The feedback is received within the predetermined period of time, the network compiles the data which can be then used to interpret the network service quality, diagnostic information as to catastrophic failures as well as mild failures, overall service, perceived quality of new services and features, and quality of internetworking.

8 Claims, 5 Drawing Sheets

FIG. 4

Level One Record (0-reserved for no comment) — 90

| CALLING PARTY (92) | CALLED PARTIES (94) | QUALITY OF XMISSION (96) | SPEED AND ACCURACY OF CONNECT/DISCONNECT (98) | BLOCKING (100) | RELIABILITY OF CONNECTION (102) |
|---|---|---|---|---|---|
| PHONE NUMBER | PHONE NUMBER 1 | 1-9 | 1-9 | 1-9 | 1-9 |
|  | PHONE NUMBER 2 | 1-9 | 1-9 | 1-9 | 1-9 |

FIG. 5

Level Two Record — 110

| CALLING PARTY (112) | CALLED PARTIES (114) | QUALITY OF XMISSION (116) | CALL SET-UP DELAY (118) | ECHO (120) | NOISE (122) | VOLUME (124) | OPERATOR RESPONSE (126) | DISTORTION (128) | DROP CALL (130) | VARY OF XMISSION (132) |
|---|---|---|---|---|---|---|---|---|---|---|
| PHONE NUMBER | PHONE NUMBER 1 | 1-9 | 1-9 | 1-9 | 1-9 | 1-9 | 1-9 | 1-9 | 1-9 | 1-9 |
|  | PHONE NUMBER 2 | 1-9 | 1-9 | 1-9 | 1-9 | 1-9 | 1-9 | 1-9 | 1-9 | 1-9 |
|  | ... | ... | ... | ... | ... | ... | ... | ... | ... | ... |
|  | PHONE NUMBER n | 1-9 | 1-9 | 1-9 | 1-9 | 1-9 | 1-9 | 1-9 | 1-9 | 1-9 |

| Location | Service | Compiled Response |
|---|---|---|
| AREA NUMBER 1 (LEVEL 1) | XMISSION QUALITY | 3.7 |
| | CONNECT/ DISCONNECT SPEED AND ACCURACY | 8.3 |
| | RELIABILITY OF CONNECTION | 8.1 |
| AREA NUMBER 1 (LEVEL 2) | SET-UP DELAY | 8.1 |
| | ECHO | 3.2 |
| | NOISE | 8.7 |
| | VOLUME | 7.9 |
| | DISTORTION | 8.1 |
| | DROP CALL | 8.8 |
| | VARIATION OF XMISSION | 9.0 |

METHOD AND APPARATUS FOR OBTAINING FEEDBACK REGARDING DATA NETWORK SERVICES

BACKGROUND OF THE INVENTION

1. Field of the Invention

The present invention relates generally to telecommunications networks and specifically to obtaining user feedback as to the quality of data telecommunications services.

2. Description of the Related Art

Telecommunications systems are known to include a plurality of telephones or data terminals including computers and fax machines, a plurality of Local Exchange Carriers (LECs) and/or a plurality of Private Branch Exchanges (PBXs), and a plurality of Interexchange Carriers (IECs). Each of the data terminals is connected to either an LEC or PBX through some sort of network termination equipment, most likely a modem. Each of the LECs or PBXs are couple to at least one IEC, where the IEC between LECs. As is generally known, long distance service providers are known as IECs, local telephone companies are known as LECs and independent businesses sometime operate their own PBX(s). Recent legislative events in the United States have served to blur the distinct boundaries among the service providers.

To enable a calling party to communicate with a called party, a network connection must be established. Generally, the calling party initiates the establishment of the network connection by entering the called party's telephone number. The called party's telephone number is routed to the calling party's LEC (or PBX as the case may be) which in turn interprets the called telephone number to determine if a local or long distance call is indicated. As is known, the determination of a long distance call is made if a long distance prefix of "1" followed by a valid area code; absent the valid area code, a local call is deemed to have been placed. The LEC then completes the network connection and the communication takes place assuming that the called party is available.

If, however, the number dialed is for a long distance call, the LEC routes the call to an IEC. The IEC interprets the telephone number and routes it either to another IEC, a PBX or a LEC. When the network connection is finally made to the called party's LEC, the call is completed subject to availability of the called party and/or terminal. The calling and called terminals/parties communicate until terminated by an on-hook condition detected by the network.

As an alternative to establishing the connection through an IEC, the LEC of the calling party may route the call to another LEC which then completes the network connection to the called party.

Over the past 15 years, the telecommunications industry has dramatically changed. Prior to this period, telecommunications typically supported voice communications over wireline to wireline connections. Today, data, digitized voice digitized video and multimedia are communicated over wireline, wireless, cable satellite and internet mediums and various combinations thereof.

In addition to the dramatic changes in the telecommunications infrastructure, the services being provided have also dramatically changed. Such changes include 800 and 900 number calls, large conference calls via bridges, video-conferencing calls, data networking, facsimile transmissions and other data and multimedia services.

As a result of the increase in telecommunications services and infrastructures along with the evolving legal restrictions on service providers, competition has dramatically increased. To distinguish one's self from the competition, a network service provider spends millions of dollars to upgrade services and enhance the network and then advertise those enhanced services to customers.

While many network providers test their equipment for acceptable performance levels, they receive little, if any, feedback on quality from customers on a real-time per call basis. If a customer does provide feedback, it is usually after a catastrophe has occurred. For example, a customer may be blocked from placing a call for a significant period of time, have an existing call unexpectedly terminated or the communication may be of such poor quality that the data transmission is incorrectly received and/or displayed. Further, this feedback is often provided days or weeks after the incident. In many cases, there may be no indication of an unreceived data transmission. Unlike voice transmission, real time disruption of data transmission may go unnoticed.

Thus, network service providers are receiving little, if any feedback as to customers' perceptions of quality and what is received is often too stale to be of useful value. Such sporadic and generalized customer feedback has limited usefulness in determining future planning, the quality of new services and enhancements, user behavior profiles, interexchange carrier perceived quality, diagnostic information as to catastrophic and mild failures, and overall general service.

There is accordingly a need for a new method and apparatus for obtaining realtime feedback to a network service provider in order to solve or ameliorate one or more of the above-described problems.

SUMMARY OF THE INVENTION

The method and apparatus for obtaining realtime feedback on network services on a per data call basis is accomplished in an embodiment of the present invention by providing a method and apparatus for obtaining real-time, call by call feedback from customers as to the quality of network data services. This may be accomplished once a communication has been established via a network connection between a calling party and at least one called party. Upon completion of the communication, at least a portion of the network connection is retained by one of the parties involved in the communication. During this predetermined period of time, the terminal/party provides feedback as to the quality of the received data transmission and reception. If the feedback is received within a predetermined time, the network compiles the data which can then be used to interpret network service quality, diagnostic information as to catastrophic and mild failures, overall general service.

Further features of the above-described invention will become apparent from the detailed description hereinafter.

The foregoing features together with certain other features described hereinafter enable the overall system to have properties differing not just by a matter of degree from any related art, but offering an order of magnitude more efficient use of processing time and resources.

Additional features and advantages of the invention will be set forth in part in the description which follows, and in part will be apparent from the description, or may be learned by practice of the invention. The advantages of the invention will be realized and attained by means of the elements and combinations particularly pointed out in the appended claims.

It is to be understood that both the foregoing general description and the following detailed description are exemplary and explanatory only and are not restrictive of the invention as claimed.

The accompanying drawings, which are incorporated in and constitute a part of this specification, illustrate preferred embodiments of the apparatus and method according to the invention and, together with the description, serve to explain the principles of the invention.

BRIEF DESCRIPTION OF THE DRAWINGS

FIG. 4 illustrates a feedback response record in accordance with the present invention.

FIG. 5 illustrates an alternative feedback response record in accordance with the present invention.

DETAILED DESCRIPTION

Generally, the present invention provides a method and apparatus for obtaining real-time, call by call feedback from customers as to the quality of network data services. This may be accomplished once a communication has been established via a network connection between a calling party and at least one called party. Upon completion of the communication, at least a portion of the network connection is retained by one of the parties involved in the communication. During this predetermined period of time, the terminal/party provides feedback as to the quality of the received data transmission and reception. If the feedback is received within a predetermined time, the network compiles the data which can then be used to interpret network service quality, diagnostic information as to catastrophic and mild failures, overall general service.

Figure 1:
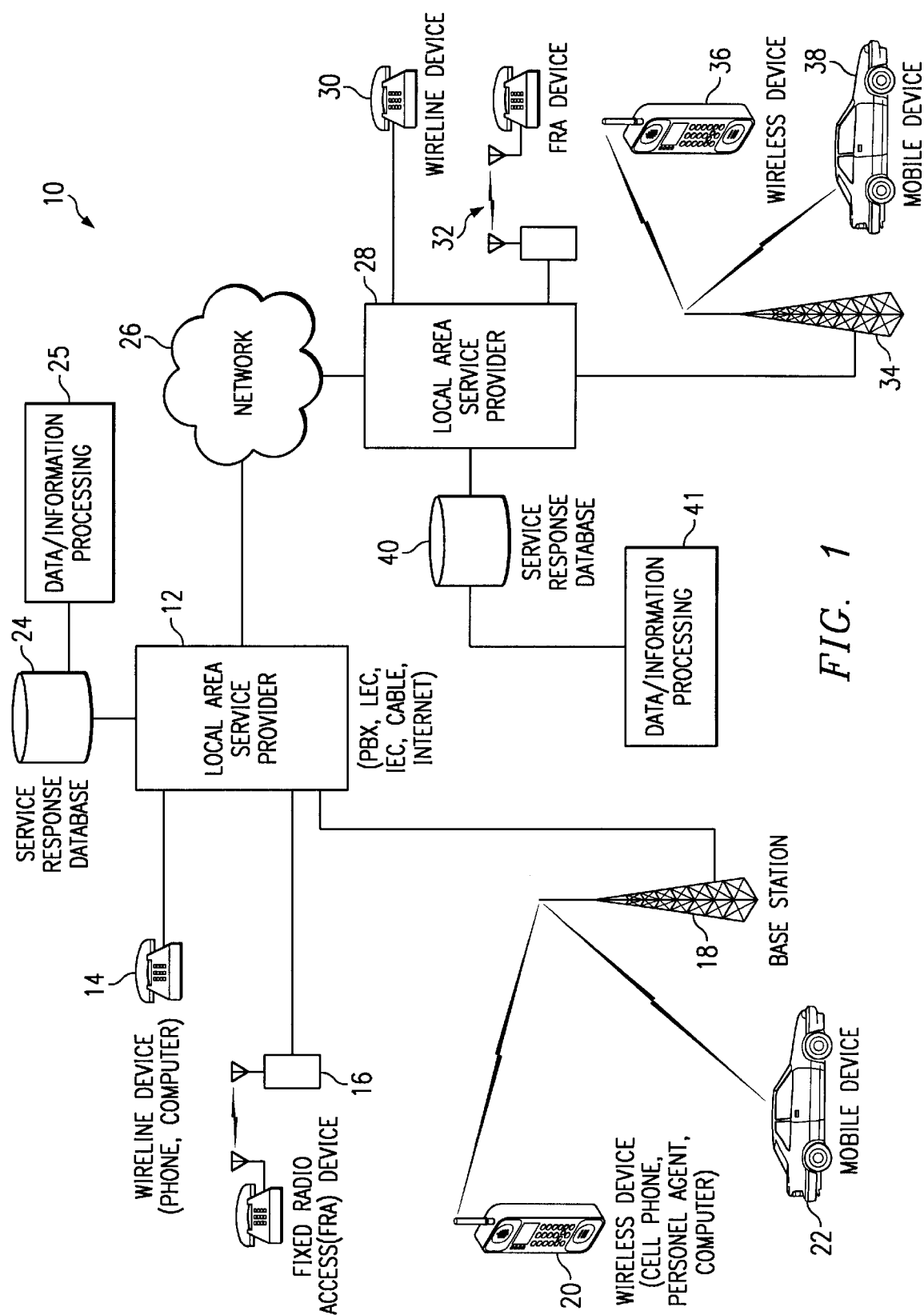
FIG. 1 illustrates a schematic block diagram of a telecommunications system in which the present invention may be incorporated.

Referring now to FIG. 1, an end-to-end telecommunications network 10 is described. Telecommunications network 10 includes two local area service providers 12,28 coupled to network 26. Network 26 may be, but is not limited to a local exchange carrier (LEC), an interexchange carrier (IEC), cable infrastructure, satellite infrastructure, internet infrastructure, wireless infrastructure or any combination thereof.

Local service providers 12,28 may be, but are not limited to private branch exchanges (PBXs), LECs, an IEC, a cable company, a local internet service provider, a wireless communication provider or a satellite communication provider. Local are service providers 12,28 are coupled to a plurality of communication devices such as wireline device 14,30 (which may be an ordinary telephone, computer with a network interface or a facsimile machine), fixed radio access (FRA) device 16,32 or a wireless base station 18,34. Wireless base station 18,34 provides radio communications to wireless communications devices 20,36 or mobile wireless devices 22,38. Wireless device 20 may be a cellular or PCS phone or modem, personal agent, standard fixed wireless modem or facsimile machine.

Local area service providers 12,28 are each coupled to a service response data base 24,40. Service response data bases 24,40 compile the feedback responses as to customers perceived quality of the network services as inputted on a call by call basis. The compilations that each service response data base 24, 40 performs for its associated local area service provider 12,28 may be bundled for sale or licensed to other local area service providers. In addition, the compiled data may be used to obtain information regarding future planning, perceived quality of new services and features, to obtain a profile of user behavior, to determine which partnering exchange carriers offer better quality as perceived by the customer, to obtain diagnostic information as to catastrophic failures as well as mild failures, to obtain diagnostic information, to improve overall service, and to offer better internetworking. As will be appreciated by one skilled in the art, the customer feedback may be received from any or all wireline devices 14,30 FRA devices 16,32, wireless devices 20,36 or mobile devices 22,38. Data/Information Processors 25,41 then perform appropriate data processing and analysis of database content.

The feedback responses from the operators of the communication device 14, 16, 20, 22, 30, 32,36,38 may range from a simple single input as to the overall perceived quality or to a very detailed multi input response. For example, network service provider could establish two levels of feedback. The first level of feedback could be for a minimum number of inputs or questions. For example, the operators of the communication devices may be asked to respond to their perception as to the quality of transmission, speed, and accuracy of connection and disconnection, blocking, reliability of connection, and the appearance quality on a terminal or on a facsimile printout. For these responses, the user could input a number via the keypad on the data terminal or may be automated on the fax machine, or data terminal itself. The number input may be range from one to nine, where one represents poor quality, and nine represents very high quality. The respondent has no comment regarding this input, he could enter a zero. Having input the response, the operator of the communication device may either enter an end of response signal such as pressing the pound sign (#) or simply hang up.

The second level of feedback response may ask the user to input several more indications as to the quality of the transmission. For example, the user may be asked to respond to setup delay, echo heard on the line, noise on the line, volume, any distortion, where the call has been dropped and variations in transmission. With a facsimile transmission, the output of the facsimile could be assessed. Based on the perceived quality of the data transmission, as with the first level the operator may use his or her keypad to enter a response of one to nine to each question or zero if the operator has no comment. Of course, the response may also be automated in the case of a data terminal, or the input from a facsimile machine may be manual based on user intervention and perception of the received quality.

To encourage operators of communication devices to provide the feedback responses, a local area service provider may offer service discounts each time a complete response is received. For example, for the first level of the communication device operator may receive a five percent (5%) discount on each network access that the operator provides feedback, while operators providing second level responses may receive a greater discount. As one skilled in the art will readily appreciate, the local area service provider must have some mechanism for identifying which of its customers will be providing level one and level two feedback responses. Such mechanisms may include but not be limited to customer subscriptions, contracts for level two responses or assumptions based on the fact that all customers will provide responses.

Upon receiving feedback responses service response data bases 24,40 interpret the data to determine the quality of the transmission on a call by call basis. For example, if the data being provided from a given geographic area identifies a catastrophic problem within the network, a local area service provider can respond within minutes to restore service. Alternatively, the data may indicate degradation in service at certain times of the day, thereby providing information that the network may need additional resources to handle these peak times. As mentioned above depending on what information the local area service provider is seeking, the compiled data may be used to obtain information regarding future planning, perceived quality of new services and features obtain a profile of user behavior, determining which partnering exchange carriers offer better quality as perceived by the customer, obtaining diagnostic information as to catastrophic failures as well as mild failures, obtaining diagnostic information and improving overall general service.

Figure 2:
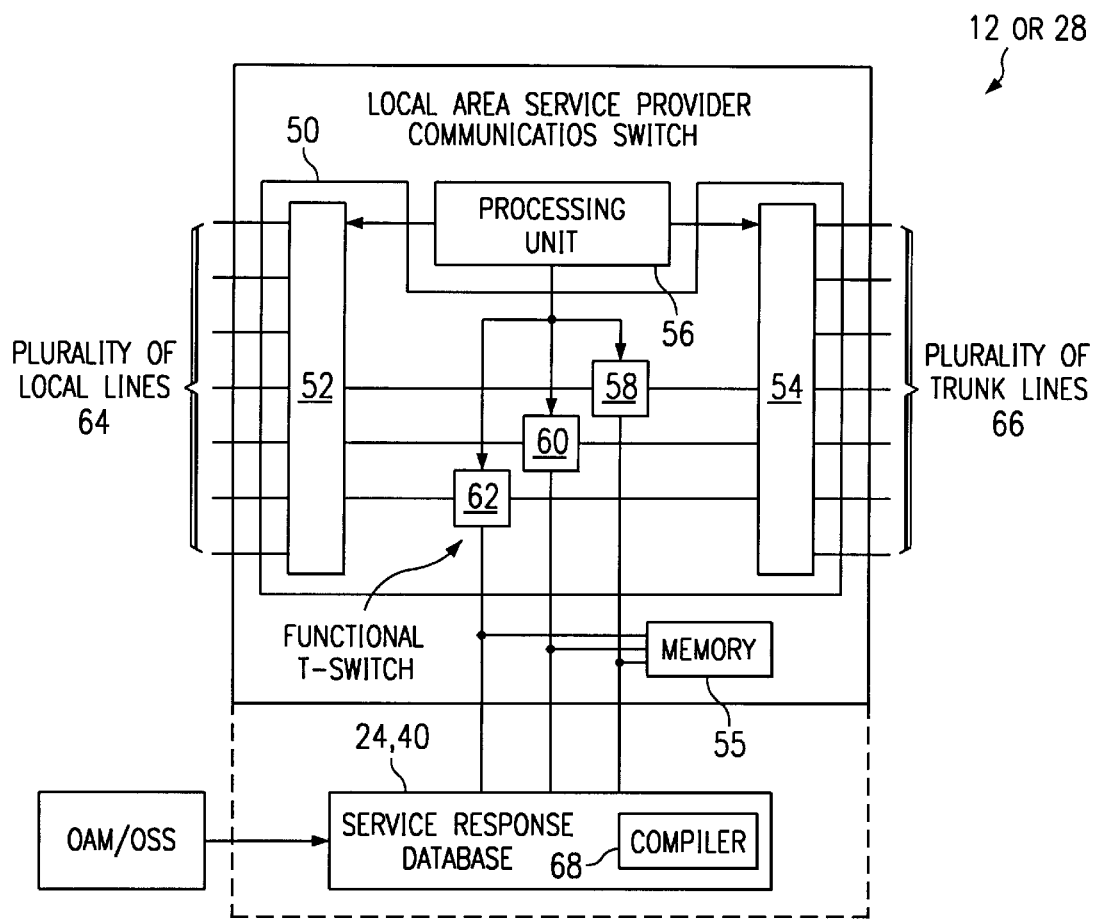
FIG. 2 illustrates a schematic block diagram of a local area service provider of FIG. 1.

FIG. 2 illustrates a schematic block diagram of the local area service provider 12,28 containing only those components which are germaine to the discussion of the present invention. As shown, the local area service provider 12,28 includes a communication switch 50, a processing unit 56, and memory 55. Communication switch 50 includes a line interface 52 which couples a plurality of local lines 64 to a local area service provider and a trunk interface 54 which couples a plurality of trunk lines 66 to a local area service provider. Plurality of local lines 64 couple local area service provider to the wireline devices 14,30, the FRA device 16,32 and the base stations 18,34. Plurality of trunk lines coupled the local area service provider to other local area service providers where the network 26. In addition to the interfaces 52 and 54 the communication switch 50 includes a plurality of functional T switches 58, 60, 62. Functional T switches may be physical T switches, or electronic bridges. In either case, the functional T switch 58,60,62 is controlled by the processing unit 56 to connect one of the local lines 64 to one of the trunk lines 66 to facilitate a long distance network connection. When a communication being supported by the network connection is terminated the processing unit 56 controls the functional T switch to couple the local line 64 to either the memory 55 or the service response data base 24,40.

For a local call processing unit 56 controls a T switch to connect one of the local lines to another one of the local lines, thereby establishing network connection. The termination of the local call processing unit 56 controls the T switch to connect one or both of the local lines to either memory 55 or to service response data base, 24,40. Processing unit 56 may determine when a local or long distance call has been terminated by detecting either a special input indicating termination of the call and entering feedback mode, for example—the star (*) button for a normal termination process.

Local area service provider 12,28 is also shown to include the service response data base 24,40 which in turn includes a compiler 68. Note that the service response 24,40 is shown as the dotted line coupled to a local area service provider indicating that the service response data base 24,40 may be an integral component of the local area service provider or even a separate component. As a separate component the service response data base 24,40 is operated by the operator of the local area service provider or an independent operator. Also note that the real-time feedback responses could be directly routed to the service response data base or buffered in memory 55. The responses are buffered, the data is relayed to the service response data base when polled by the compiler 68. Regardless of how the data is received by the service response data base, compiler 68 interprets the data to provide the desired service information. This data coupled with other data/information received from an operating support system will provide both call by call as well as typical trouble reports. Correlation of these two sets of information will provide more information than previous systems.

Figure 3:
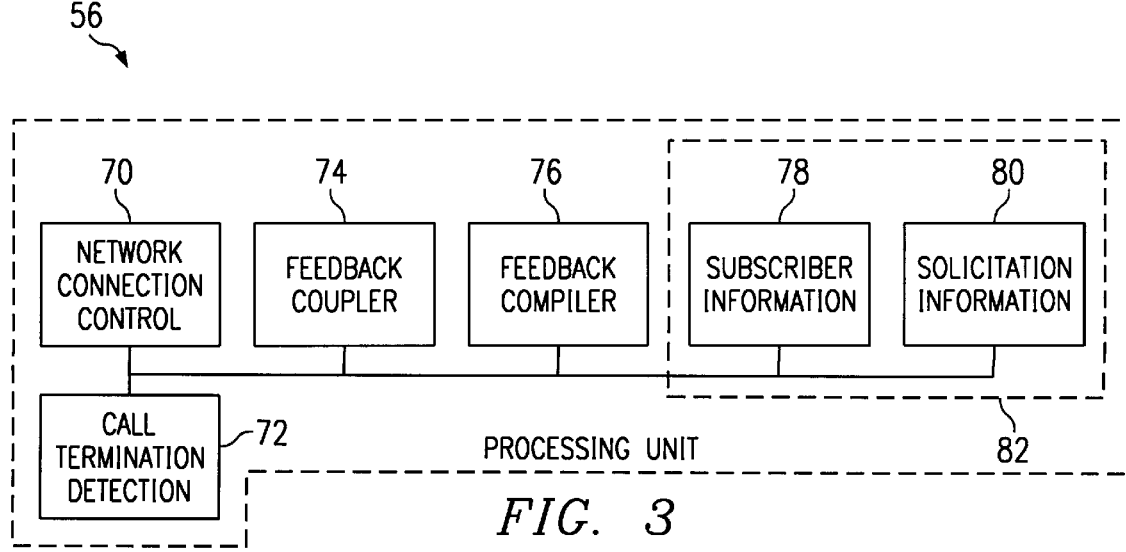
FIG. 3 illustrates a schematic block diagram of a processing unit of the local area service provider of FIG. 2.

FIG. 3 illustrates a schematic block diagram of the processing unit 56 which may be a personal computer, workstation, plurality of microprocessors, plurality of microcontrollers, and individual microprocessor, or individual microcontroller, or any other device that based on input instructions can manipulate data in a given way. As shown, the processing unit 56 includes a network connection controller 70 called the termination detection section 72, feedback coupler section 74, feedback compiler section 76, and memory 82 which includes subscriber information 78 and solicitation information 80. Sections of the processing unit 56 may be separate co-processors, program instructions implemented by the processing unit or a combination thereof.

In operation, network connection control section 70 coordinates the coupling of local lines to trunk lines for long distance calls and local lines to local lines for local calls via the T switches. Such a connection is well known in the art thus no further discussion will be provided except to facilitate the understanding of the present invention. Call termination detection section 72 determines when the calling party and at least one called party have ended their communication. This may be determined either by detecting one or both parties have gone on hook or receiving from one of the parties a special termination code. For example, special termination code as mentioned above may be the star (*) button.

Upon detecting the termination feedback coupler section 74 controls the functional T switch to couple a local line to the service response data base and monitors the local line to an indication that the communication device has provided a feedback response before expiration of the predetermined period of time. An indication may be by detecting the actual feedback response or code, for example the pound (#) button indicating that the communication device has ended the feedback mode. Feedback coupler 74 controls the T switch disconnect the local line when feedback has been provided or when the predetermined period of time expires. Feedback may be automatically initiated by an unattended receiving terminal. A buffer stores the received data in a buffer and retransmits the received data back to the sending station. Alternately, in the case of a facsimile transmission, the facsimile received is printed, automatically re-scanned and re-transmitted back to the sending terminal for verification either electronically or by user intervention. This will provide a complete and accurate verification of an acceptable data transmission. The feedback may be entered in much the same way as described above and may contain other indications of quality, such as paper quality, paper quantity, toner level, print out quality.

FIG. 4 illustrates a level one feedback response record 90 from a customer. As shown, level one record indicates a field for the calling parties phone number 92 and a field for the call parties phone number 94 which fields will be automatically updated by the network. The record also includes a field for the feedback response indicating quality of transmission 96, a field for feedback response related to the speed and accuracy of the connection and disconnection 98, a field for the response to blocking 100, and a field for a response to a reliability of connection 102. Will not shown a FIG. 4, each individual response by a called party or a calling party will be time stamped. The time stamping may be done by the processing unit 56.

A party may respond via the keypad, keyboard, or other data entry means associated with its communications device.

FIG. 5 illustrates a level two record 110, which includes but is not limited to fields for the calling parties phone number 112, called parties phone number 114, quality of transmission 116, call set up delay 118, echo noise 120, noise 122, volume 124, and operator response 126, distortion 128, dropped call 130, and variations in transmission quality 132. As with the level one record, the respondents are asked to provide for each category a response in the range of one to nine regarding the satisfaction of the particular service. As indicated by FIGS. 4 and 5, a feedback response may be provided by any or all of the calling party or the called parties. Note that feedback could be provided for any type of communication that could take place over a network connection, for example, the communication may be a teleconference call between multiple parties, video conference, a one to one voice call, data transmission, or multimedia transmission. As is known a teleconference may be established by a calling party conferencing in the called parties or all the parties dialed into a bridge which establishes the teleconference call. Also note that the particular fields the FIGS. 4 and 5 are representative of the feedback that could be requested and do not represent an exhaustive list. As one skilled in the art will readily appreciate the operator for communication device may provide feedback as to any number of factors that impact network quality.

Figures 6, 7:
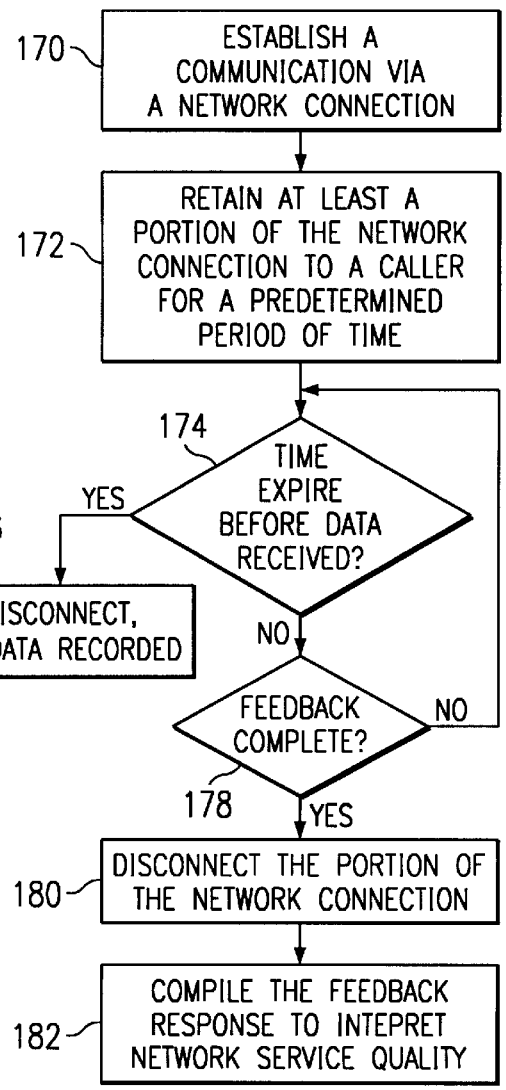
FIG. 6 illustrates a compiled feedback record in accordance with the present invention.
FIG. 7 illustrates a logic diagram of the present invention.

FIG. 6 illustrates compilation record 140 that includes a field for the geographic location of interest 142, particular service 144, and the compiled response 146. As shown, the location is area one and the data is compiled based on level one responses and level two responses. Particular area designated reference by the location may be as broad as the entire area serviced by the local area service provider or as small as an individual user. As shown, level one compiled information shows that the transmission quality is 3.7 while the disconnect speed and accuracy responses is 8.3, and the reliability connection is 8.1. From this compilation example, the network provider can see that for a given period of time is the designated area customers are satisfied with the connect and disconnect speed and accuracy and reliability of the connection, but are somewhat dissatisfied with the quality of transmission. This will be correlated with the data from an OSS to find the root cause of a problem, if any.

The compiled level two data shows that the setup delay 146 has a compiled response of 8.1 echo 148 has a compiled response of 3.2, noise 150 has a compiled response of 8.7, volume 152 has a compiled response of 7.9, distortion 154 has a compiled response of 8.1, dropped call 156 has a compiled response of 8.8, and variation of transmission 154 has a compiled response of 9.0. From the compiled level two data, the user is satisfied with all types of quality except for echo 148. Thus the local area or network service provider can refer that the reason the level one data indicated that satisfaction of the quality of transmission is due to echo in the lines and can take corrective action. Note that the compiled data FIG. 6 is for a given period of time that may be in the range of few minutes to several hours.

FIG. 7 illustrates a logic diagram that represents a method for obtaining for feedback responses from communication device operators. Process begins with step 170 where a network establishes a communication between a calling party and at least one called party via network connection. As previously mentioned, the network connection may be local within a PBX, LEC or may be long distance through a plurality of PBX's, LEC's and/or IEC's and further via wireline, wireless, Internet cable or satellite links. Once the communication has been terminated, the network determines whether it has received a feedback response from the communication device step 172. If time expires before a response is received, the process proceeds to 176 with a portion of the network connection is terminated and no data is recorded.

If however, the time is not expired, the network determines whether an end of feedback signal has been received. As previously mentioned, the end of feedback signal may be the pound (#) sign on the telephone. This is determined at step 178. The time has not expired and a feedback complete signal has not yet been received, process waits either for the time to expire or feedback to receive. If a feedback response is received, the process proceeds to step 180 where a retained portion of the network connection is disconnected. Having done this, the process proceeds to step 182 where the feedback responses are compiled to interpret network service quality.

Figure 8:
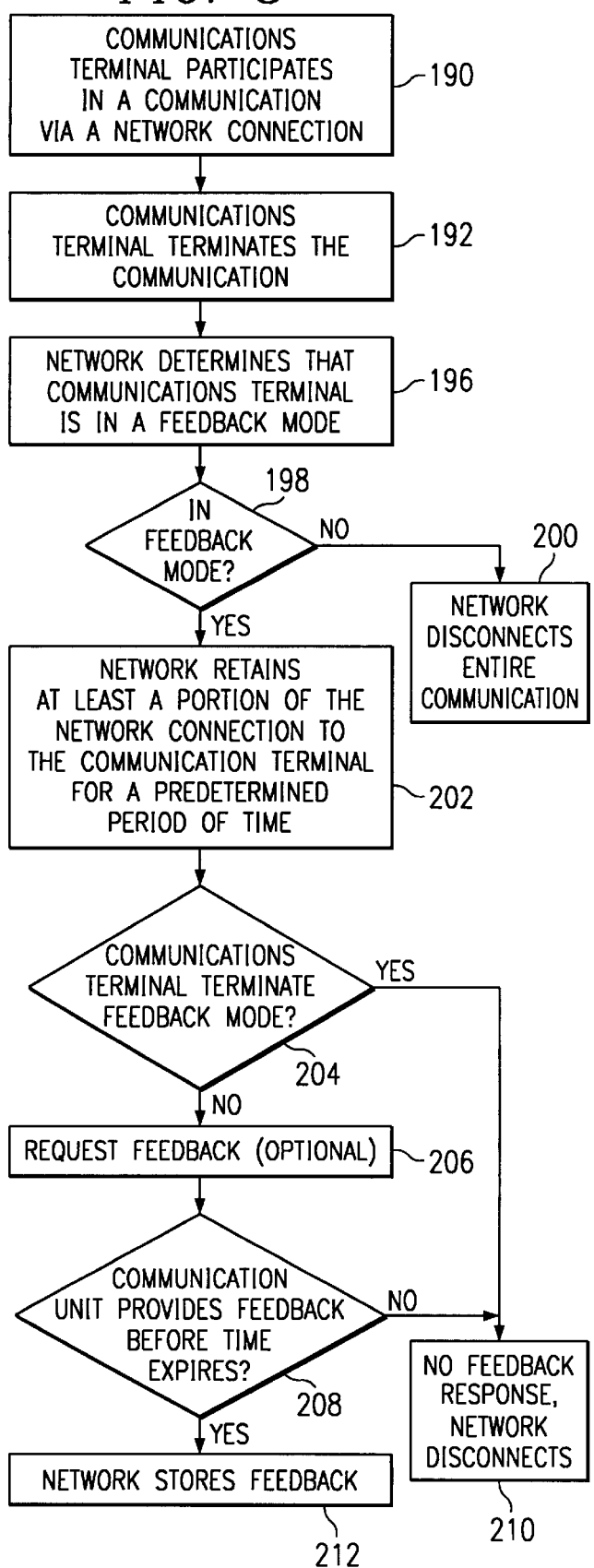
FIG. 8 illustrates an alternative logic diagram of the present invention.

FIG. 8 illustrates an alternate logic diagram for obtaining feedback responses from communication device operators as to their perceived quality of network services. Process begins in step 190 where a communications terminal or device participates in a communication via network connection. Process proceeds to step 192 where the communication is terminated by the communication terminal. As previously mentioned, communication terminal may terminate a communication by hanging up the phone.

Process proceeds to step 196 where the network determines whether communication terminal was in feedback mode. This may be determined by either receiving a special code, manually entered, or detecting an automatically generated feedback signal indicating that the communication terminal has re-initiated a normal communication within the predetermined period of time.

In step 198, if the communication terminal is not in the feedback mode, the network disconnects the entire network at step 200 from the terminal. If however, the communications terminal is in feedback mode, process proceeds to step 202, and the network retains at least a portion of the network connection to the communication terminal for a predetermined period of time. The network determines whether the communications terminal has terminated the feedback mode at step 204 communication terminal may terminate the feedback mode either automatically or by entering a manual signal. The communication terminal is terminated the feedback mode, the process proceeds to step 210 where no feedback response is provided and the network disconnects the retained portion of the network connection.

If however, the communication terminal remains in the feedback mode, process proceeds to optional step 206. At this step, the network may provide a prompt to the communication terminal as to what particular services feedback is solicited from. Having done this, the process proceeds to step 208, where the network determines whether the communication terminal has provided a feedback response before the predetermined time expires. The communication unit has not provided this feedback response process proceeds to step 210, where no feedback response is provided the network disconnects the terminal. If the communication terminal is provided feedback, the process proceeds to step 212 where in the network stores the feedback response.

Figure 9:
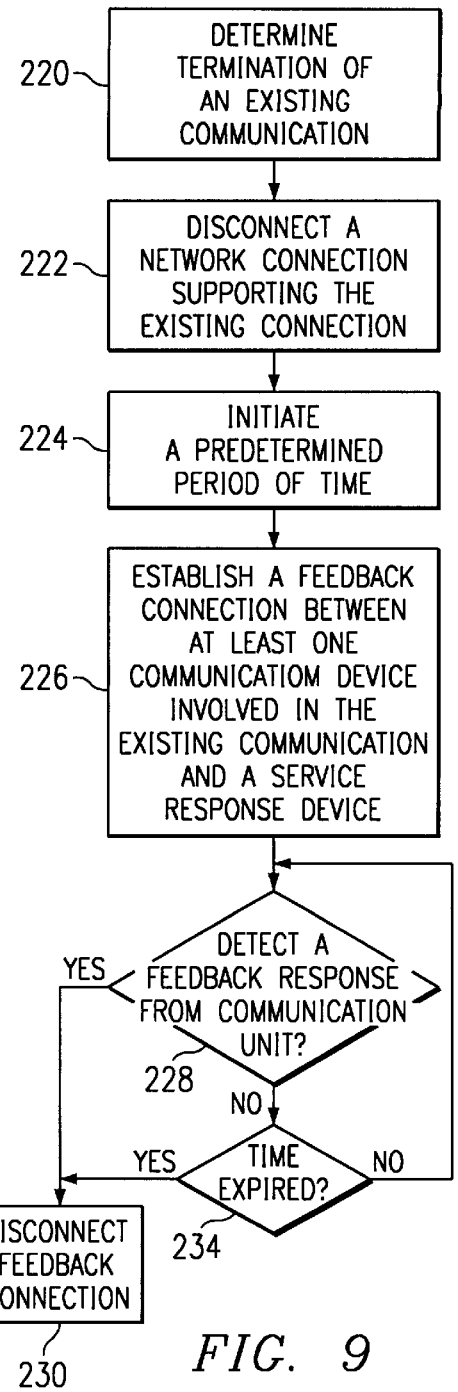
FIG. 9 illustrates another alternative logic diagram of the present invention.

FIG. 9 illustrates yet another alternative logic diagram for obtaining feedback responses from operators of communication terminals as to their perceived quality of network services. Process begins at step 220 where determination is made as to whether an existing communication has been terminated. If so, the process proceeds to step 222 where the network connection supporting the existing communication is disconnected. The process proceeds to step 224 where initiation of a predetermined period of time has commenced. In step 226, the feedback connection between at least one communication terminal involved in the existing communication and a service response device is established. At that point, the network determines the step 228 whether the communication device has provided a feedback response. If you ask the process proceeds the step 230 where the feedback connection is disconnected. If however the network has not yet detected a feedback response the process proceeds to step 234 where the network determines whether the time is expired. If not, the process waits for either a feedback response to be received or for time to expire. Once the time expires the process proceeds to step 230 for disconnection.

Other such embodiments of the invention will be apparent to those skilled in the art from consideration of the specification and practice of the invention disclosed herein. It is readily apparent that the above described invention may be implemented in any type of data communication system. It is intended that the specification and examples be considered as exemplary only, with a true scope and spirit of the invention being indicated by the following claims.

What is claimed is:

1. A method for providing feedback for diagnostics and service marketing on network services, the method comprising the steps of:

a) establishing a data communication via a network connection;

b) upon completion of the communication retaining for a predetermined period of time at least a portion of the network connection to at least one participant in the communication;

c) receiving the feedback response via a keyboard input from the at least one participant during the predetermined period of time; and d) compiling the feedback response from the at least one participant to interpret network services quality.

2. The method of claim 1 wherein step a) further comprises establishing a facsimile communication involving the at least one participant.

3. The method of claim 1 wherein step a) further comprises establishing a multimedia communication involving at least one participant.

4. The method of claim 2 wherein step a) further comprised establishing the network connection is at least one of an entry exchange carrier, a local exchange carrier, or a private branch.

5. The method of claim 4 wherein step b) further comprises retaining for the predetermined period of time a connection between the at least one participant and the inter exchange carrier, the local exchange carrier, the private branch exchange to provide at the least a portion of the network connection.

6. The method of claim 5 wherein step c) further comprises receiving the feedback response wherein the feedback response is related to at least one of quality of transmission, speed and accuracy of connection disconnection, and reliability of connection.

7. The method of claim 6 wherein step c) further comprises receiving the feedback response, wherein the feedback response is further related to at least one of call set up delay echo, noise, volume, operator response, distortion, drop call, blocking, variation of transmission.

8. The method of claim 7 where in step d) further comprises compiling at least one of the quality of transmission, speed and accuracy of connection and disconnection, and reliability of connection to provide an indication of quality of the network services regarding at least one of: diagnostic response, preventive diagnostics, service improvement, improve networking, marketing information, future service planning, and user profiles.

* * * * *